United States Patent

Bassi et al.

Patent Number: 6,005,872
Date of Patent: Dec. 21, 1999

[54] METHOD AND DEVICE FOR SYNCHRONIZING DIGITAL DECODER AND ENCODER CLOCKS

[75] Inventors: Thierry Bassi, Liffre; Claude Rambault, Ostwald, both of France

[73] Assignee: Thomson multimedia S.A., Courbevoie, France

[21] Appl. No.: 08/682,186

[22] Filed: Jul. 17, 1996

[30] Foreign Application Priority Data

Jul. 28, 1995 [FR] France ............................. 9509261

[51] Int. Cl.$^6$ ............................. H04J 3/18; H04J 3/06
[52] U.S. Cl. .................. 370/477; 370/509; 370/516; 370/521
[58] Field of Search .................... 370/464, 474, 370/503, 509, 516, 477, 521; 375/344, 354, 355, 356, 360, 362, 364, 371, 373, 376, 379

[56] References Cited

U.S. PATENT DOCUMENTS

| | | | |
|---|---|---|---|
| 4,390,985 | 6/1983 | Fourcade et al. | 370/517 |
| 5,003,559 | 3/1991 | Kanai et al. | 375/358 |
| 5,274,681 | 12/1993 | Yamada et al. | 375/372 |
| 5,287,182 | 2/1994 | Haskell et al. | 348/500 |
| 5,381,181 | 1/1995 | Deiss | 348/423 |
| 5,467,137 | 11/1995 | Zdepski | 348/423 |
| 5,486,864 | 1/1996 | Zdepski | 348/423 |
| 5,502,727 | 3/1996 | Katanzaro et al. | 370/271 |
| 5,565,923 | 10/1996 | Zdepski | 348/423 |
| 5,572,556 | 11/1996 | Satoh | 375/372 |

*Primary Examiner*—Chau Nguyen
*Assistant Examiner*—Soon-Dong Hyun
*Attorney, Agent, or Firm*—Joseph S. Tripoli; Frederick A. Wein; Alexander J. Burke

[57] ABSTRACT

The disclosure relates to a method of synchronization of clocks wherein, in a system including a digital decoder of a receiver equipped with a sampling clock and a digital encoder of an transmitter also equipped with a sampling clock, said method includes the following stages: in the transmitter, coding by packets of samples of a signal by time intervals of predetermined duration and triggering of the transmission of a data frame when a packet of data is ready to be sent; in the receiver, detection of start of said frame, and generation of a reference signal following said detection, said reference signal being used to correct the clock of the receiver. Another object of the invention is a method of synchronization of clocks wherein, in a system including a digital decoder of a receiver equipped with a sampling clock and a digital encoder of a transmitter also equipped with a sampling clock, in which the transmitter sends frames containing data packets corresponding to a number known of samples, said method includes the following stages in the receiver: reception of a data frame including a packet of data, decoding of said packet and writing of the decoded data in a memory, reading of said decoded data in said memory at a frequency that is a function of the frequency of said clock of the decoder, comparison at a predetermined time of the occupancy of said memory with respect to a threshold, and correction of said clock of the decoder according to the result of said comparison. The invention is applicable in the field of digital transmission, notably transmissions between digital visiophones.

14 Claims, 3 Drawing Sheets

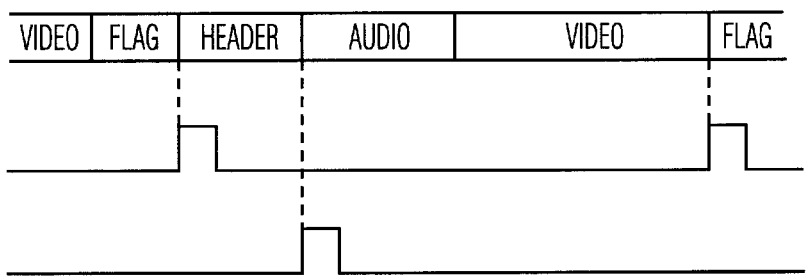
FIG. 1a
FIG. 1b
FIG. 1c
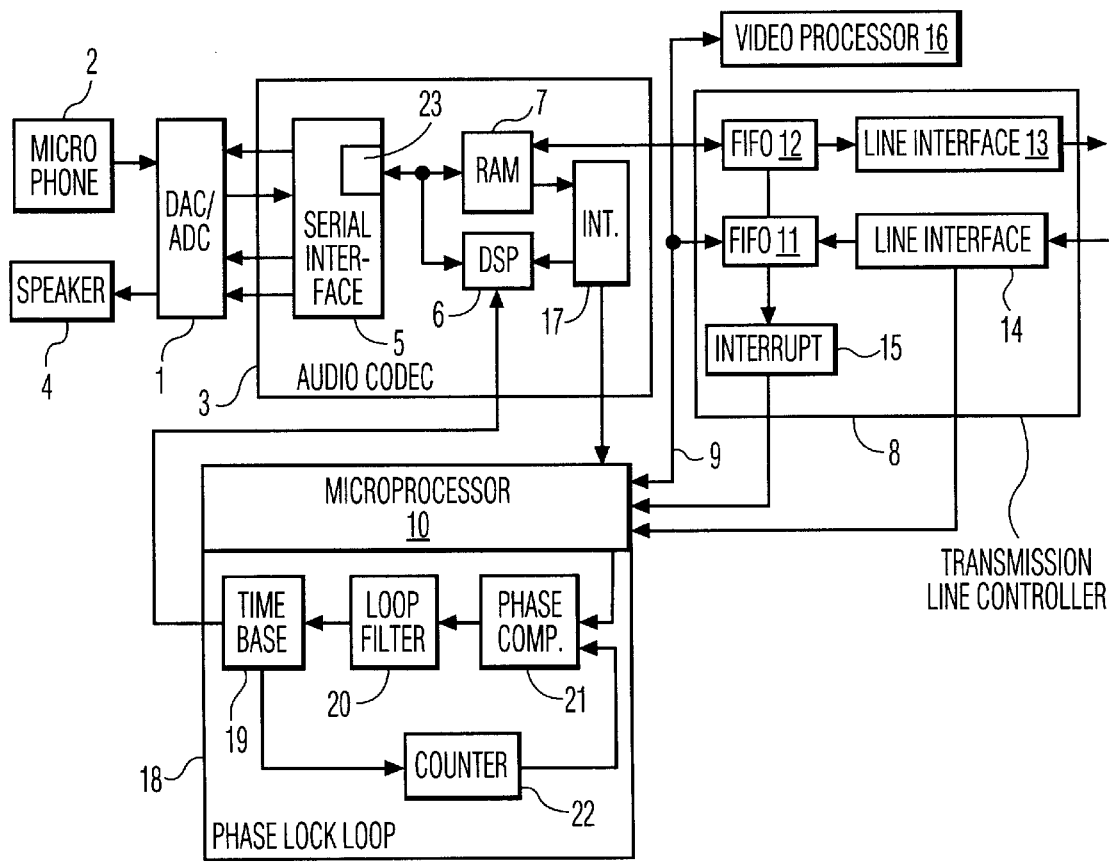
FIG. 2

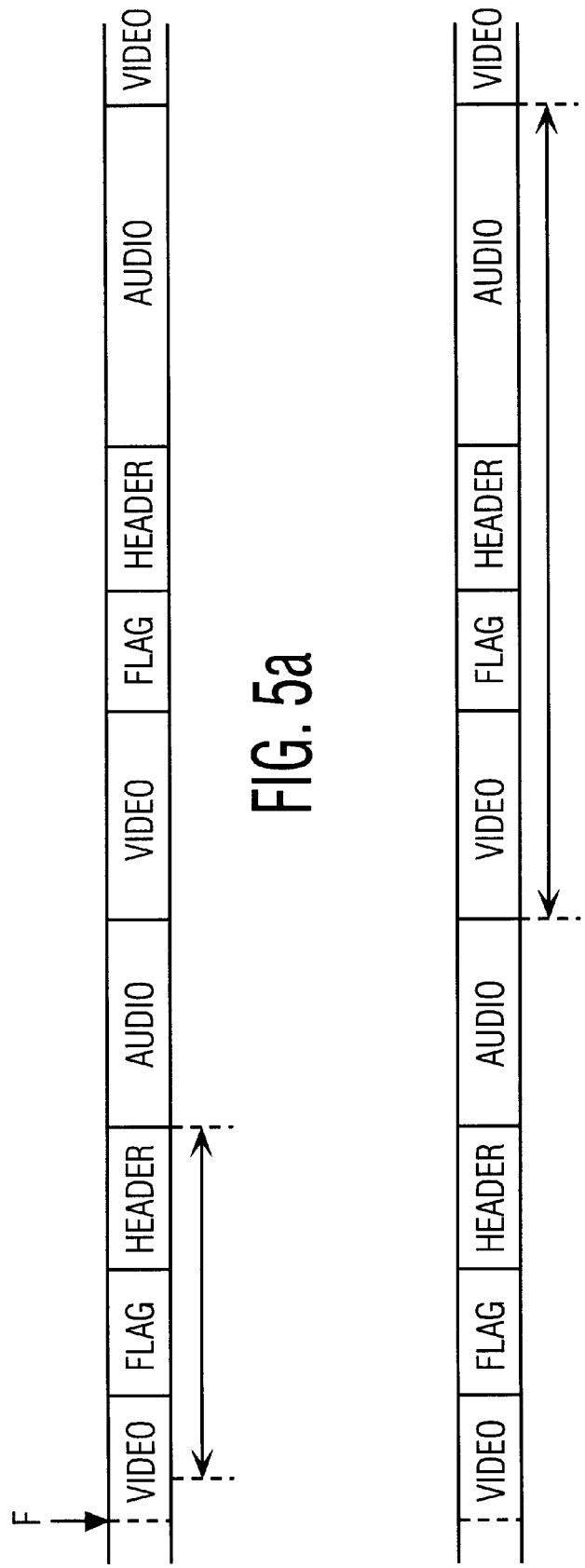

METHOD AND DEVICE FOR SYNCHRONIZING DIGITAL DECODER AND ENCODER CLOCKS

BACKGROUND OF THE INVENTION

The invention relates to a method and device for synchronization of clocks of digital encoders and decoders. It is applicable notably to audio encoders/decoders used in visiophones.

DESCRIPTION OF THE PRIOR ART

In systems that transmit several types of data (video, audio, etc.), these data are multiplexed. In addition, since the available band width is generally narrow, the audio and/or video data are compressed.

The problem of high fidelity, natural restitution of the audio data in the decoder then arises. Generally an audio sampling frequency as close as possible to that of the encoder is used, the reason being that if the decoder clocking is of lower frequency than that of the encoder then some samples will be missed, whereas if the decoder's clocking frequency is higher then some samples will be repeated.

In both cases, this can degrade the quality of the restitution and cause audible defects.

SUMMARY OF THE INVENTION

The object of the present invention is a method of synchronization of clocks wherein, in a system including a digital decoder of a receiver equipped with a sampling clock and a digital encoder of an transmitter also equipped with a sampling clock, said method includes the following stages:

in the transmitter, coding by packets of samples of a signal by time intervals of predetermined duration, and transmission of a data frame when a packet of data is ready to be sent, in the receiver, detection of start of said frame, and generation of a reference signal following said detection, said reference signal being used to correct the clock of the receiver.

In a variant of the invention, said signal sampled is an audio signal.

In a variant of the invention, detection of the end of the encoding of an audio data packet causes interruption of the transmission of a previous frame and transmission of a new frame.

In a variant of the invention, a frame includes at least one frame identification flag, one header and one audio data packet.

In a variant of the invention, said detection of the start of frame is the detection of said identification flag.

In a variant of the invention, said reference signal is generated only if the analysis of the header or another part of the frame reveals that it contains audio data.

In a variant of the invention, said reference signal is a pulse sent to a phase locking loop (PLL) providing said sampling clock.

In a variant of the invention, stuffing bits being added to the frame during transmission and eliminated on reception, said reference signals undergo low-pass filtering upstream of said PLL.

Another object of the present invention is a method of synchronization of clocks wherein, in a system including a digital decoder of a receiver equipped with a sampling clock and a digital encoder of a transmitter also equipped with a sampling clock, in which the transmitter sends frames containing data packets corresponding to a number known of samples, said method includes the following stages in the receiver:

reception of a data frame including a packet of data, decoding of said packet and writing of the decoded data in a memory, reading of said decoded data in said memory at a frequency that is a function of the frequency of said sampling clock of the decoder, comparison at a predetermined time of the occupancy of said memory with respect to a threshold, correction of said sampling clock of the decoder according to the result of said comparison.

In a variant of the invention, the data packets are samples of an audio signal sampled at the frequency of the sampling clock of the transmitter.

In a variant of the invention, said predetermined time is chosen independently of the sampling clock of the receiver.

In a variant of the invention, a data frame includes a frame identification flag, a header and an audio data packet.

In a variant of the invention, said comparison threshold corresponds to the size of a decoded audio packet.

In a variant of the invention, the size of said memory corresponds to the size of two packets of decoded audio data.

In a variant of the invention, the occupancy of said memory is determined by computing the difference between a writing counter and a reading counter associated with said memory.

In a variant of the invention, the time at which said comparison is carried out is the time when the audio data packet is ready to be decoded.

In a variant of the invention, said correction slows said clock when the occupancy of said memory is below said threshold and accelerates said clock when the occupancy of the said memory is above said threshold.

In a variant of the invention, said sampling clock of the receiver is generated by a PLL.

Another object of the invention is a device for reception of digital audio signals, wherein, a coding by packets of samples of a signal having been performed in the transmitter, each packet corresponding to a known number of samples, the transmission of a data frame being triggered when a packet of data is ready to be transmitted, said device includes:

a circuit for detection of the start of a data frame containing said packets;

a circuit for generation of a reference signal following said detection;

a clock corrected using said reference signal.

In a variant of the invention, said detection circuit includes a circuit for comparison of the data received with a frame identification flag contained in said frames.

In a variant of the invention, said samples are samples of a sampled audio signal.

In a variant of the invention, said generation circuit includes a microprocessor generating a pulse when a frame identification flag is detected, if the header of the frame indicates that it contains one of said packets.

In a variant of the invention, said generation circuit includes a comparison circuit that, following the detection of a frame identification flag, compares the header of a frame against one or more special header values indicating that the frame contains packets of audio data, the reference signal including a pulse generated when said comparison is positive.

In a variant of the invention, said clock of the reception device includes a PLL whose input receives said reference signal, said loop including a divider in its return loop, the division factor of said divider being equal to the product of the duration of the samples of an audio data packet and the transmitter's clocking frequency.

Another object of the invention a device for reception of digital signals wherein, samples of a signal having been encoded into packets in the transmitter, each packet corresponding to the same number of samples, said device includes:

means of decoding said packets, means of writing the decoded samples in a memory, means of reading said samples in said memory, means of comparison at predetermined times of the occupancy of said memory with respect to a threshold, means of correction of the clock of the receiver according to the result of said comparison.

In a variant of the invention, said samples are samples of an audio signal.

In a variant of the invention, said comparison is carried out at times independent of said sampling clock.

In a variant of the invention, the reading frequency of the decoded samples in said memory is the frequency of said sampling clock.

In a variant of the invention, said means of decoding, writing and comparison include a signal processor.

In a variant of the invention, said sampling clock of the receiver is generated using a PLL.

BRIEF DESCRIPTION OF THE DRAWINGS

The invention will be better understood and other advantages and characteristics will become clear on reading the following description of an embodiment, taken only as a non-limitative example, making reference to the appended figures, of which:

FIG. 1a is a diagram illustrating the constitution of the multiplexed signal generated by the encoder, FIG. 1b is a timing diagram indicating with respect to FIG. 1a the detection of a flag in the encoder according to a first embodiment, FIG. 1c is a timing diagram indicating with respect to FIG. 1a the synchronization pulse of a phase locking loop according to a first embodiment, FIG. 2 is a block diagram of an encoder and a decoder according to a first embodiment, FIG. 5a illustrates the jitter introduced by a first embodiment, FIG. 5b illustrates the jitter introduced by a second embodiment.

Figure 3:
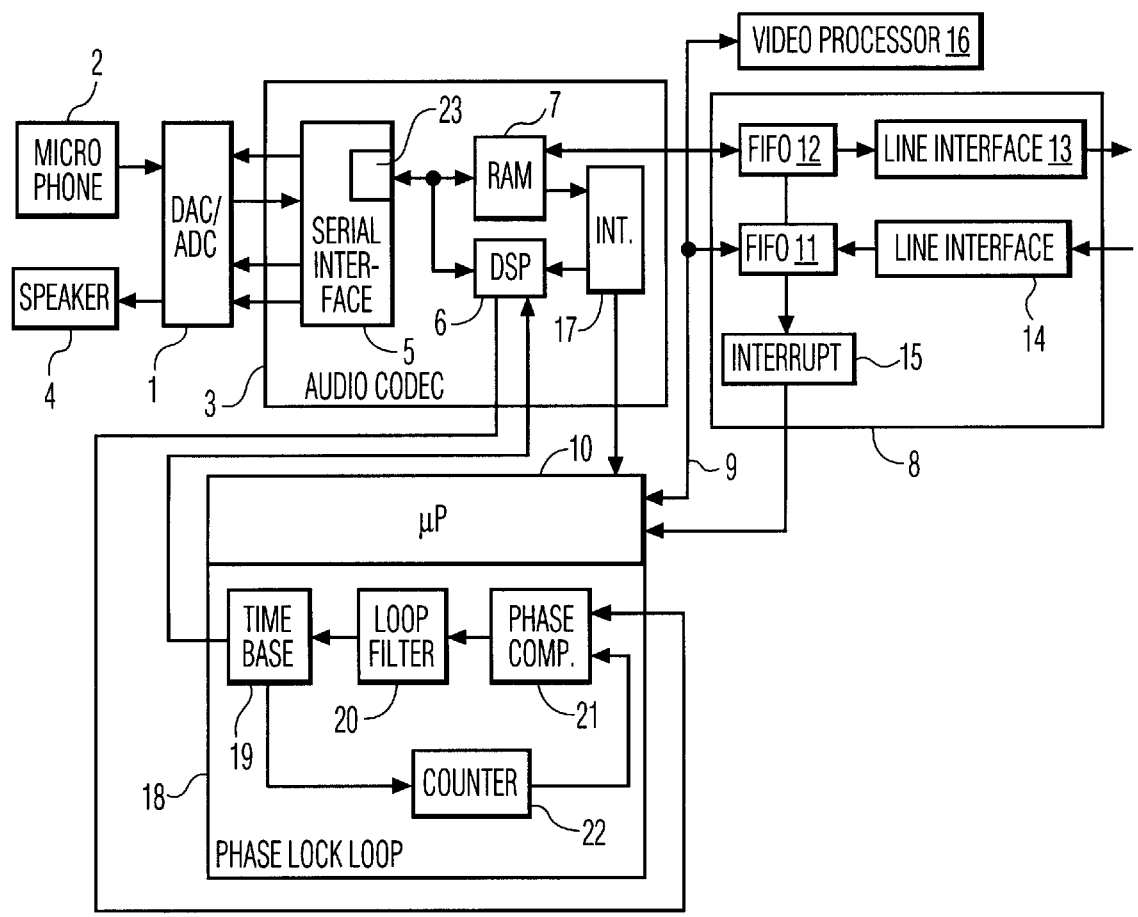
FIG. 3 is a block diagram of the synchronization circuit of a decoder according to a second embodiment.

In the description below we shall assume that the analog audio signal is sampled at a frequency of 8 kHz. The samples are grouped into packets of 240 samples, one packet every 30 ms. The duration of the samples of a packet is therefore always the same. These packets of samples are compressed by a compression circuit in the encoder, the compression being carried out, in the present embodiments, by means of an algorithm of the type MP-MLQ (Multi-Pulse Maximum Likelihood Quantization).

FIG. 1a illustrates the constitution of the multiplexed signal generated by the encoder. A frame known as an HDLC frame (High level Data Link Control) includes an frame identification flag, followed by a header, itself followed by compressed video data and compressed audio data. The frame can also include other types of data (information or control data).

First, we shall give the description of a first embodiment. Given that there are many parts common to the first and second embodiments, the description of the second embodiment will make frequent reference to the first one and will emphasize the differences between the two embodiments.

In both embodiments, a PLL is used to generate the sampling clock. It is understood that this PLL can be implemented by a program executed by the microprocessor that will be described below, even though the functional parts of a PLL are described separately in the rest of this description.

FIG. 2 is a block diagram of the audio encoding and decoding circuits of a visiophone. The device includes a digital-to-analog and analog-to-digital converter 1 that performs the analog-to-digital conversion of the signal from a microphone 2 or the digital-to-analog conversion of the audio samples from the audio codec 3. The resulting analog signal of the latter conversion is fed to a loud speaker 4.

The codec 3 includes a serial interface 5 connected to the converter 1 via four connections: a sampling clock, a transmission clock, and digital data input and outputs. The codec also includes a digital signal processor (or "DSP") 6 which is also connected both to the serial interface 5 and to a RAM 7. This RAM constitutes the buffer of the codec, which is used to store notably the audio data received via the serial interface and encoded, or received via a HDLC transmission line controller 8 and to decode. The RAM 7 is connected to a data bus 9, to which are also connected a microprocessor 10 and the controller 8. The bus 9 is also connected to the video processing circuit 16. The microprocessor 10 supplies the 8 kHz sampling clock and a 30 ms clock frame to the processor 6 of the codec.

An interrupt circuit 17 generates an interrupt at the processor 6 when the microprocessor 10 has written an encoded audio packet in the RAM. Inversely, when the processor 6 writes an encoded audio packet in the RAM, an interrupt is generated at the microprocessor 10.

The serial interface 5 includes an output buffer 23 that is read and cleared at the frequency of the sampling clock and filled by the processor 6.

The HDLC transmission line controller 8 includes two FIFO stacks, one for reception (stack 11), the other for transmission (stack 12). Reading or writing in the two stacks is controlled by the microprocessor 10. This microprocessor also determines the multiplexing of the audio, video and other data. The two stacks are connected to the bus 9 and also to the HDLC line interfaces 13 and 14. During transmission, the role of the HDLC interface is to add stuffing bits to the data stream coming from the FIFO stack 12 in order to avoid combinations of bits identical to the identification flag of the frames. Since the flag is constituted by the binary word "01111110", the function of the HDLC interface 13 is to add a "0" bit after all sequences of five "1" bits. During reception, the HDLC interface 14 eliminates the stuffing bits and reconstitutes the original sequence.

The FIFO stacks 11 and 12 are connected to the microprocessor 10 via an interrupt circuit 15 that generates interrupts under certain conditions of filling of the stacks. The circuit 15 can activate one or several interrupts. In addition, the receiving line interface 14 has a comparison circuit intended to generate an interrupt signal at the microprocessor 10 after detection of the identification flag of a frame in the data stream and/or after the first byte following the identification flag. These signals are illustrated in FIGS. 1b and 1c.

As previously mentioned, one of the main functions of the microprocessor 10 is to supply the 8 kHz sampling clock to the rest of the circuit. During a communication with a second audio encoder-decoder of a visiophone, the first encoder-decoder uses an internal sampling clock as close as possible to 8 kHz, without taking account of the data received. According to the invention, it is then up to the second encoder-decoder to synchronize itself on the clock of the first encoder-decoder.

Which of the two encoders-receivers synchronize itself on the other is determined by a protocol which is not the subject of the present invention. In a variant of the invention, the called device synchronize itself with the calling device.

In a first embodiment, to create the sampling clock from the signals received the microprocessor 10 uses the interrupt signal generated by the HDLC line interface 14. The period of this signal is close to 30 ms, since the microprocessor of the transmitter visiophone forces the start of a new frame precisely every 30 ms (to within the precision of the internal clock). During transmission the stuffing bits introduced by the HDLC line interface cause a jitter that varies according to the content of the frames. Nevertheless, the average period of the flag is still 30 ms.

The microprocessor therefore includes a PLL 18 including a phase comparator 21, a loop filter 20 and a time-base 19. The output of the time-base 19 constitutes the sampling clock and loops on an entry of the phase comparator 21 via a divider by 240 (performed using a counter) 22. The second entry of the phase comparator receives a signal generated by the microprocessor 10 from the interrupt signal of the HDLC interface. The signal sent to the loop is substantially that in FIG. 1c, to within the precision of the processing time of the microprocessor. It is sent by the microprocessor only after analysis of the header of the current packet. The reason is that there may be packets containing no audio data that are multiplexed with the packets of FIG. 1a. Analysis of the header enables the type of data transported by a packet to be determined.

In a variant of this embodiment, an analysis of the headers is carried out at the HDLC interfaces, and an interrupt is sent to the microprocessor only when the header indicates the presence of audio data in the packet. The analysis of the header is carried out upstream of the microprocessor: the interrupt signal of FIG. 1c can be sent directly to the PLL.

The loop filter 20 is a low-pass filter intended to average the signal at its input.

In this way, the microprocessor generates the 8 kHz sampling clock and synchronizes the audio codec of the receiving visiophone on the audio codec of the transmitting visiophone.

In a variant of the invention, the processor 6 manages the sampling clock.

In a second embodiment of the invention, the sampling clock is not generated directly on detection of the frame identification flag, but by monitoring the level of occupation of the output buffer of the audio codec.

FIG. 3 is a block diagram of an encoder-decoder generating the sampling clock according to the second embodiment of the invention. In FIGS. 2 and 3, the same parts carry the same references.

In this case, the processor 6 performs an analysis in the output buffer 23. This analysis is triggered each time an audio data packet is ready to be decoded by the processor 6, in other words each time an audio data packet has been demultiplexed from a complete frame and written in the RAM 7.

Figure 4:
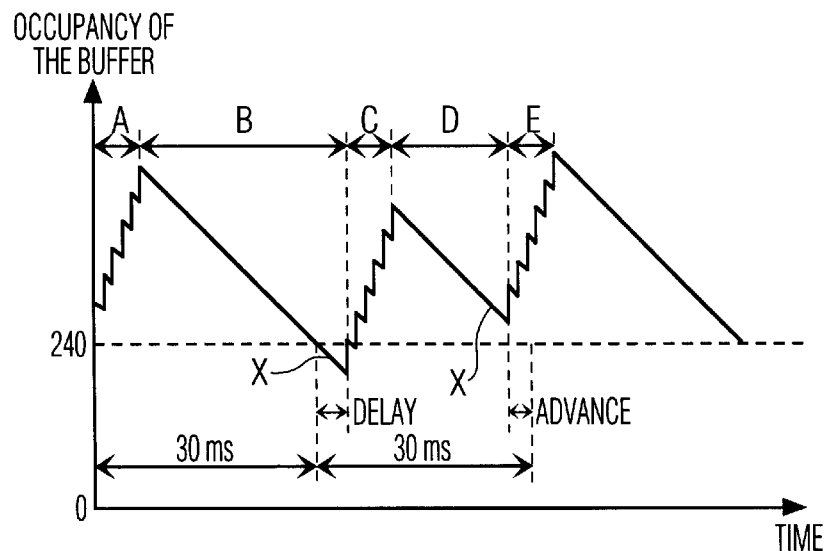
FIG. 4 is a graph illustrating the evolution of the filling of the output buffer memory of the decoder according to a second embodiment.

FIG. 4 illustrates the variation of the occupancy of the buffer with time. During periods A, C and E, the processor 6 decodes and writes six 40-byte sub-packets. Between the writing of two sub-packets, the buffer continues to be read, which explains the saw-tooth shape of the curve. During periods B and D, there is no writing in the buffer, so the occupancy of the buffer drops steadily. Analysis of buffer occupancy is performed at points X. The variations of the ordinates of the point X are due to the jitter introduced by the stuffing bits. The packet received, during the segment B includes more stuffing bits than an average packet, so the signal triggering the analysis of the buffer occupancy is delayed by the corresponding amount. Inversely, the packet received during segment D includes less stuffing bits than average, so the analysis is advanced.

After triggering of the analysis, the processor 6 determines the occupancy of the buffer and compares this with a given threshold. If the occupancy exceeds this threshold, then the processor 6 sends a correction signal to the PLL 18 to accelerate the sampling clock; if the occupancy of the buffer is less than the threshold, then the correction signal will slow the sampling clock.

In the present embodiment, the size of buffer 23 corresponds to two packets of decoded audio data (480 bytes), and we choose a comparison threshold of 240 bytes. However, the choice of the threshold can be quite different and is not necessarily about half the capacity of the buffer.

The buffer 23 is organized as a loop and is addressed for reading and writing by means of independent reading and writing pointers, so the occupancy of the buffer can be determined by computing the difference between the writing and reading pointers.

In the present embodiment, this difference between the writing pointer and the reading pointer is evaluated when a new audio packet is ready to be decoded, i.e. when it has just been written in the RAM 7 by the microprocessor 10. A comparison between this difference and the threshold previously fixed determines the correction to be made. A difference greater than 240 bytes will increase the clock frequency; a difference less than 240 bytes will lower it.

The period of the signal triggering the analysis in the buffer is about 30 ms, as before, a jitter being introduced by the presence of stuffing bits during transmission. However, this jitter is greater than in the first embodiment, since the number of stuffing bits causing the jitter may be greater. This phenomenon is illustrated by FIGS. 5a for the first embodiment and 5b for the second.

In the first case, we assume that an interrupt (reference F on the schema 5a) is generated when an audio packet is encoded in the transmitter. The effect of this interrupt is to force the start of a new frame, audio data having priority over video data. The audio data are written at the start of the frame, the video data then filling the rest of the available frame until the availability of the next encoded audio packet.

Now the interruption can occur during the transmission of a video byte. We wait for the end of this byte before starting the next HDLC frame. The interrupt corresponds to the 30 ms reference period, as explained above. In the receiver, the pulse destined for the PLL is generated at the end of the header. The number of bits between the reference F and the pulse destined for the PLL is represented by the double-ended arrow in FIG. 5a. The stuffing carried out by the HDLC interface is performed only on the header and on the lasts bits of the video byte during which the interrupt F appears. We can take a digital example by assuming that the flag and the header (before stuffing) are constituted by one byte. In the most favorable case (no stuffing bits and an interrupt occurring at the end of the last video byte of the frame previous), 16 bits located between the reference F and the pulse destined for the PLL. In the worst case, this number of bits is 27. The jitter can therefore be 11 bits at most.

In the second embodiment, the calculation is different. Here the receiver deduces its references from the ends of audio packets within a frame. If we consider audio packets of 24 bits (6.4 Kbits/s data rate reserved for the audio data), then the jitter can become 48 bits.

In a variant of the second embodiment, the averaging performed on the pulses destined for the PLL in the second embodiment is broader than in the first embodiment, in order to reduce the effect of the larger jitter.

This averaging can be performed by a low-pass filter upstream from the PLL. Notably, the average of the differences between the reading and writing pointers in the second embodiment is computed over several frames.

In a particular embodiment, we implement the first embodiment of the invention in a receiver when the transmitter gives priority to the encoded audio packets as explained above (transmission of a new HDLC frame after an interrupt associated with the end of the encoding of an audio packet). If this is not the case, the second embodiment is used; autonomous use of this second example is also possible.

Finally, although the embodiments described here give priority to audio packets, frames of another types can also be used in a similar manner. The choice of an audio-type packet for synchronizing clocks is related to the fact that these frames correspond to a known number of samples once they are decoded. For example, in the present embodiments, the duration of the set of samples of a frame is always 30 ms (to within the precision of the sampling clock of the transmitter).

What is claimed is:

1. In a system for receiving a bitstream of compressed data transmitted from a transmitter, a method of synchronization of a receiver sampling clock to a transmitter sampling clock, said bitstream being made up of frames having a frame frequency, each frame comprising at least a first kind of data obtained by compression of a known number of samples, sampled at a transmitter sampling frequency, wherein said frame frequency corresponds to said transmitter sampling frequency divided by said known number of samples, said method including the following steps in said receiver:

receiving a frame and detecting a reference signal in said received frame, said reference signal being repeated with a period substantially independent of jitter associated with bit stuffing;

decompressing said first kind of data in said received frame and storing decompressed data in a buffer;

reading said stored data at a frequency that is a function of a receiver sampling clock frequency; and synchronizing said receiver sampling clock to said reference signal for minimizing jitter associated with elimination of stuffing bits.

2. A method according to claim 1, wherein said reference signal is a header in said received frame.

3. A method according to claim 1, wherein said reference signal corresponds to the end of reception of said first kind of data.

4. A method according to claim 1, wherein said synchronizing step comprises comparing data occupancy of said buffer to a threshold, the comparison being triggered by said reference signal, a receiver sampling clock frequency being increased or decreased if said occupancy is higher or lower than said threshold.

5. A method according to claim 1, wherein said frame comprises a second kind of data, said first kind being audio data and said second kind being video data.

6. A method according to claim 1, wherein said frames of said bitstream comprise a variable number of stuffing bits, said frame frequency being an average value of said frame frequency, wherein said synchronization is made by averaging, on several frames, a time between two successive reference signals.

7. A Method according to claim 1, wherein said frames of said bitstream comprise a variable number of stuffing bits, said frame frequency being an average value of frame frequency, wherein said synchronization is made by comparing data occupancy of said buffer to said threshold, the comparison being triggered by said reference signal, the receiver sampling clock frequency being increased or decreased by a value corresponding to a difference between an average value of said occupancy over several frames, and said threshold.

8. A method according to claim 1 wherein said frame is an HDLC type frame.

9. A device for receiving a bitstream of compressed data and for synchronizing a sampling clock, said bitstream comprising frames having a frame frequency, each frame comprising at least a first kind of data obtained by compressing a known number of samples sampled at a transmitter sampling frequency, said frame frequency corresponding to said transmitter sample frequency divided by the number of samples, said device comprising:

a synchro generation circuit giving a reference signal at said frame frequency, said reference signal being substantially independent of jitter associated with bit stuffing;

a decompression circuit of said first kind of data and a buffer to store decompressed data;

a processor for reading said stored data at a frequency that is a function of a receiver sampling clock frequency; and a synchronizer for synchronizing said receiver sampling clock to said reference signal for minimizing jitter associated with elimination of stuffing bits.

10. A device according to claim 9, including, a means to determine data occupancy of said buffer and to compare said occupancy to a threshold when receiving said reference signal and to calculate a difference, and a means to calculate a signal relating to said difference, said calculated signal being for use in synchronizing said receiver sampling clock.

11. A device according to claim 10 wherein said synchro generation circuit comprises a microprocessor managing decompression of data and said reference signal identifies a time when an audio packet is available for decompression.

12. A device according to claim 9, wherein said synchro generation circuit comprises a receiving line interface for receiving said bitstream and for detecting an identification flag sent in a frame.

13. A device according to claim 9, wherein
said frame includes a second kind of data, said first kind being audio data and said second kind being video data.

14. A device according to claim 9, wherein
said receiver sampling clock is generated by a digital PLL circuit.

* * * * *